United States Patent

Herndon

[11] Patent Number: 5,951,095
[45] Date of Patent: Sep. 14, 1999

[54] TRANSFORMABLE TRUCK BED COVER ASSEMBLY

[76] Inventor: Brett S. Herndon, 18524 Dallas La., Little Rock, Ark. 72211

[21] Appl. No.: 08/810,893

[22] Filed: Mar. 5, 1997

[51] Int. Cl.[6] .................................................. B60P 3/345
[52] U.S. Cl. ................ 296/165; 296/26.07; 296/100.09; 296/100.1
[58] Field of Search ..................................... 296/165, 167, 296/173, 26.04, 26.05, 26.06, 26.07, 100.06, 100.07, 100.08, 100.09, 100.1, 100.17

[56] References Cited

U.S. PATENT DOCUMENTS

| 4,768,824 | 9/1988 | Andonian | 296/165 |
| 5,102,185 | 4/1992 | Lake | 296/100.1 X |
| 5,213,390 | 5/1993 | Borchers | 296/100.06 X |

FOREIGN PATENT DOCUMENTS

| 2309275 | 8/1974 | Germany | 296/26.04 |

*Primary Examiner*—Andrew C. Pike
*Attorney, Agent, or Firm*—Dennis B. Haase

[57] ABSTRACT

A transformable cover assembly for pickup trucks is user switchable between a low profile, bed cover configuration and a fully deployed, camper configuration. The apparatus unfolds from a planar orientation into a pair of cooperating, stacked, generally wedge-shaped segments. The segments are complementary; the stacked wedge-shaped segments form an inhabitable enclosure in the general form of a parallelepiped when erected. A planar deck that is foldably deployed comprises a top that ultimately covers the upper segment, and a shroud that unfolds to form a border between the adjacent, deployed segments. A foldable framework comprising a plurality of cooperating members enables foldable transformation. As the assembly deploys it unfurls pliable, generally triangular walls at the segment sides.

9 Claims, 7 Drawing Sheets

TRANSFORMABLE TRUCK BED COVER ASSEMBLY

BACKGROUND OF THE INVENTION

1. Field of the Invention

This invention relates generally to bed covers and cover assemblies for pickup trucks. More particularly, my invention relates to a transformable cover assembly for pickup trucks that can be switched between various user selected configurations. Known prior art most relevant to this invention can be found in U.S. class 296, subclasses 100 and 165.

2. Description of the Prior Art

For several years bed covers and cover assemblies of various forms have been mounted on the beds of pickup trucks. Prior art cover assemblies, for example, can provide a covered space for human habitation. Simpler bed covers can enclose and weatherproof storage space for cargo. However, conventional bed covers and cover assemblies are subject to various limitations.

Known bed covers cannot be easily transformed into cover assemblies. On the other hand, cover assemblies are often rigid and cumbersome, and cannot easily be transformed into a simple, low profile bed cover. Utilitarian shortcomings also result as a consequence of the mounting hardware and structural linkages employed with more complex units.

Typical bed covers are made of relatively rigid material. Usually they are pivotally attached to the truck bed opposite the tailgate, for foldable positioning upon the top of the truck bed. Typically such units can be raised from the rear to allow access to the cargo space. In the closed position typical bed covers are nearly flush with the top of the truck bed, i.e., they are only a few inches greater in height than the top of truck bed. As a result precious cargo space is limited and cramped. Further, conventional bed covers must be removed or left in an awkward, open position to allow the loading of cargo taller than the top of the truck bed. This exposes the cargo to the weather. The usual bed cover is not desirable for human habitation due to the lack of interior volume and poor ventilation.

Typical cover assemblies are made of rigid material. They are fixedly mounted to the top of the truck bed with a variety of hardware mounting systems. Such cover assemblies usually comprise a front wall, opposed side walls, and a rear hatch assembly, with all four sides containing safety glass windows for rearward and lateral visibility. The roof portion of known cover assemblies is usually flush with the top of the cab of the pickup for streamlining. However, some heavier and bulkier camper inserts extend beyond the roof of the cab, and extend beyond the dimensions of the bed. When compared to simple bed covers, most cover assemblies provide a larger covered storage space. Obviously larger payloads and bulkier cargoes can be accommodated. A typical cover assembly also provides more habitable space for humans due to the greater dimensions of the structure. Creature comfort can be enhanced by the inclusion of windows within the camper structure, which can be opened for ventilation.

However, typical cover assemblies or inserts obstruct rear visibility. A simple low profile bed cover, on the other hand, usually does not obstruct the driver's rear view. Campers are difficult to attach to and detach from the truck bed, due to the sheer weight and bulk. Once removed, typical campers require a large area for off-vehicle storage. The bed cover, comparatively, is lighter in weight and requires less off-vehicle storage space.

It is therefore highly desirable to provide an improved cover assembly for the bed of a pickup truck which can be easily user-transformed from a bed cover mode to a camper mode. It is further desirable for such a transformable arrangement to overcome the utilitarian disadvantages of the prior art devices discussed above.

Typical prior art patents which show variable configuration cover assemblies for the bed of a pickup truck can be seen in a variety of prior U.S. patents. Byrd in U.S. Pat. No. 4,496,184 disclosed a flexible cover structure disposed over a plurality of frames. Benignu, Jr. in U.S. Pat. No. 5,335,960 discloses a tonneau cover which becomes a shelter roof when raised by elongated support members. Borchers in U.S. Pat. No. 5,213,390 discloses a variable configuration shelter including a relatively rigid shell that can be displaced to provide a covered lodging at the cargo carrying area.

In contrast to the prior art patents for variable configuration cover assemblies for pickup truck beds, the present invention combines the advantages of simple bed covers with those of larger cover assemblies.

SUMMARY OF THE INVENTION

The transformable cover assembly of the present invention is adapted for installation on top of a typical pickup truck bed. It can be quickly transformed between a low profile bed cover configuration, a fully expanded, cover assembly configuration, and an intermediate configuration.

The preferred cover assembly comprises a dynamic, connecting framework arranged above the pickup bed. It comprises a pair of pivotal support frames connected to mounting rails secured to the truck bed. The body of the enclosure is formed by a pair of cooperating segments, each of which, when deployed, assumes a wedge-shaped profile of generally triangular cross section. Upon full deployment of the cover assembly, the wedge-shaped halves align to form an enclosure generally in the form of a regular parallelepiped. The bottom segment is linked to the framework by suitable hinges. The top segment is hinged to an opposite end of the companion segment. Thus the cooperating segments are unfolded by the framework to form the body of the enclosure.

Flexible, generally triangular side walls are unfurled by each segment during deployment. The walls are unfolded to a deployed position in response to frame expansion. They are preferably constructed of pliable, waterproof fabric that facilitates folding and structural transformation. Visibility is enhanced by transparent, vinyl windows that are exposed when the walls are deployed. A hatch, containing a transparent rear safety glass, is pivotally deployed to form the rear of the enclosure.

Thus it is an object of this invention to provide a cover assembly for pickup trucks that presents the combined advantages of bed covers and camper shells or inserts.

Another important object is to provide a low profile, rapid deployment cover assembly for pickup trucks.

It is another object of the invention to provide a stable camper assembly that can be compactly transported in a generally flat mode.

Another object is to provide a covered cargo space for objects of different dimensions.

A related object is to provide a space for human habitation.

A still further object of my invention is to allow rapid deployment of a cover assembly from a stationary location.

Yet another object is to provide a cover assembly that is easily attachable and detachable.

Another object is to provide a cover assembly of the character described that occupies minimal storage space when detached.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

With initial reference directed to FIGS. 1–6 of the appended drawings, a typical conventional pickup truck 12 of the type having a cab, a truck bed 14 behind the cab, which truck bed is defined by upstanding sides contiguous with the rear of the cab, and a tailgate; in which my transformable cover assembly 16 is mounted. The instant cover assembly may be deployed in the closed, "bed cover" position of FIGS. 1 and 4, or it may be fully deployed in the camper configuration of FIGS. 3 and 10. During the deployment procedure, the intermediate configuration of FIGS. 2 and 8 will be assumed, as explained hereinafter.

Figure 3:
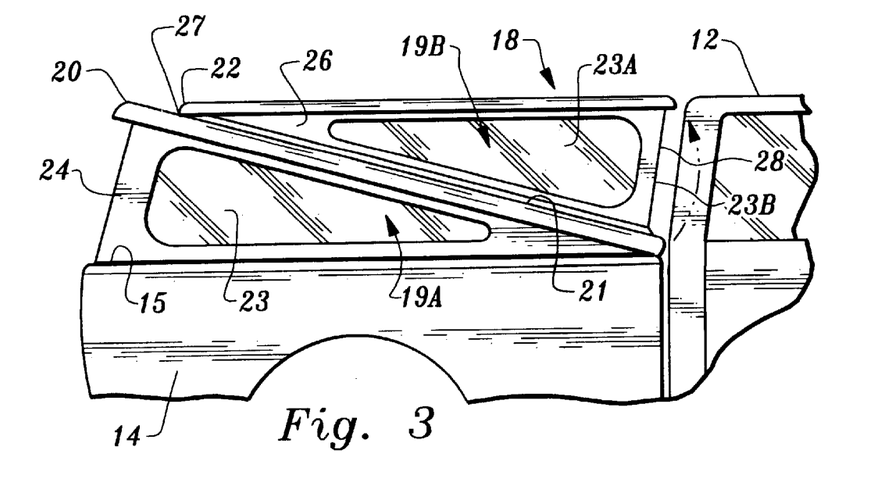
FIG. 3 is a view similar to FIGS. 1 and 2, with the truck bed cover raised at the front to assume a transformed, shell position.

Preferably the deployed enclosure in the camper mode comprises stacked segments 19A and 19B (FIG. 3). Parts described hereinafter allow the apparatus to be transformed between the flat position of FIG. 1 and the stacked position of FIG. 3. Each segment 19A and 19B is generally wedge shaped. Segment 19A is elevated at the rear of the truck, and ramps downwardly. Segment 19B is complimentary with segment 19A, in effect having its tallest dimension near the cab of the truck. When deployed these twin segments unfold and stack into an arrangement generally resembling a parallelepiped. Frame elements to be described later unfold from a generally planar orientation (FIG. 5) assumed in the bed cover mode to provide skeletal support for the twin, wedge-shaped segments 19A and 19B.

Figure 1:
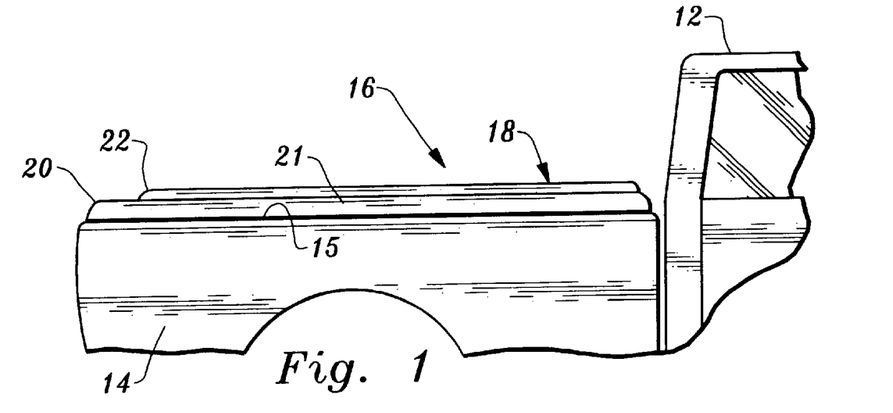
FIG. 1 is a fragmentary, right side elevational view of my transformable bed cover disposed in the bed cover mode, and mounted on a conventional pickup truck in accordance with the best mode of the invention.

The preferred cover assembly 16 (FIGS. 4, 6) comprises a compound deck 18 which, in the bed cover configuration (FIG. 1), overlies and encloses the truck bed 14. The truck bed 14 comprises a front panel 30, opposed side panels 32, and a tailgate 34. A handle travel slot 36 is located at the rear of the base frame shroud 20. The generally flat, rectangular deck 18 is operatively dynamically mounted over the truck bed by actuator framework 38 to be described hereinafter. Deck 18 preferably comprises a generally rectangular, apertured shroud 20 and a displaceable top 22. When retracted, deck 18 covers the truck bed cargo area (FIG. 1). The peripheral lip 21 of shroud 20 covers the truck cargo rail edges 15 when deck 18 is disposed as in FIG. 1. The rigid, generally planar top 22 overlies shroud 20 and normally covers the shroud opening 20A (FIG. 4) to enclose the truck bed 14. In a closed position, the outer, peripheral edge 21 of shroud 20 is positioned on top of the bed 14 with the inner perimeter of the base shroud 20 generally open to the truck bed 14. Top 22 is positioned on shroud 20, in a closed position, with the outer edge of top 22 extending beyond the inner perimeter of shroud opening 20A to complete deck 18.

Figure 2:
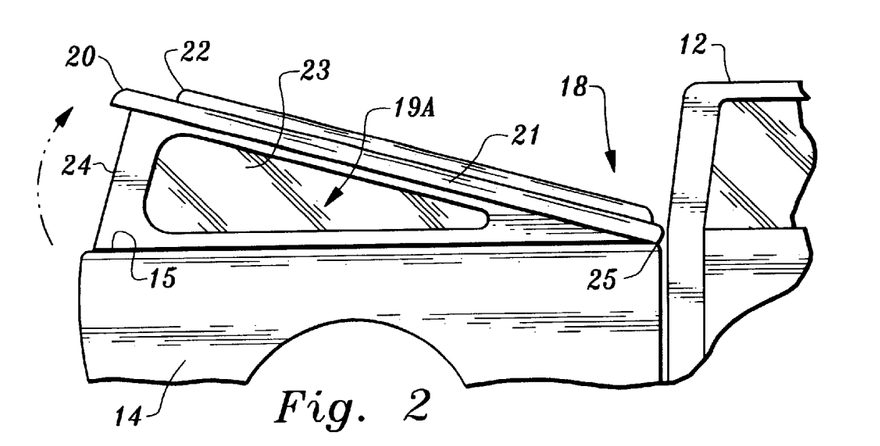
FIG. 2 is a fragmentary, right side elevational view similar to FIG. 1 with the transformable bed cover disposed in an intermediate transformed position partially raised at the rear.

In FIG. 2 the cover assembly 16 has been partially erected or transformed. Deck 18 has been lifted upwardly with respect to the rear of truck 12. Deck 18, including top 22 and shroud 20, is pivotally raised about point 25 upwardly from the truck bed 14. During this maneuver the cover assembly 16 deploys generally triangular walls 24 containing transparent vinyl windows 23. The walls are preferably made from pliable waterproof fabric that folds into or out of position as the deck 18 is raised or lowered.

In FIG. 3 deck 18 is shown in a second relative position of transformation with top 22 pivotally raised at rotation point 27 upwardly from the shroud 20 to a position wherein the deck 18 is coplanar with the roof line of the cab of the truck extended. As the top is raised relative to deck 18, pliable, waterproof walls 26 foldably deploy similarly to walls 24. Walls 26 comprise transparent, vinyl windows 23A. A similar pliable waterproof fabric front wall 28 (FIGS. 3, 10) unfolds a transparent vinyl window 23B.

With reference now to FIGS. 5, 7, 9, and 11, the preferred actuator framework 38 is utilized to "unfold" and thus control and deploy the apparatus. Framework 38 comprises a transverse crosspiece 40 extending between parallel base rails 42 that are attached above bed 14 to the truck side panels 32 by clamps 43. Opposed side rails 44 are pivotally attached to the crosspiece 40 by offset brackets 46. A transversely extending, generally C-shaped support 48 is pivotally attached to the crosspiece 40 by brackets 50. Support 48 comprises a central sleeve 56 pivotally secured with roller wheels 58 attached at each end of sleeve 56. Sleeve 56 is slidably captivated within a latch actuator assembly 60 which is attached to the underside of top 22.

Figure 5:
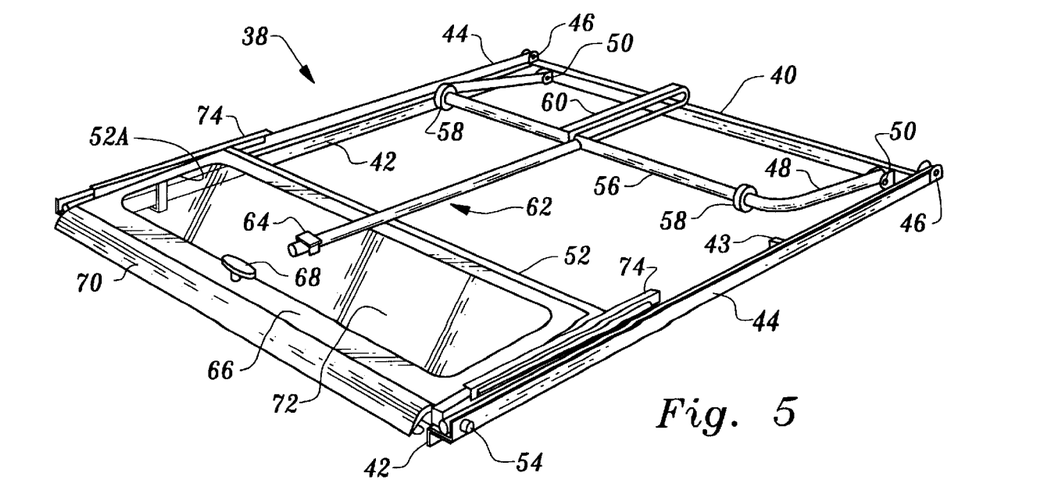
FIG. 5 is a perspective view of the preferred actuator framework, showing how the framework appears when the cover assembly is disposed as in FIG. 4.

An extendible shaft 62 comprising an outer shaft 63 slidably, coaxially receives inner shaft 62A (FIG. 9) that is attached to sleeve 56. The aft end of outer shaft 63 detachably connects to holder 64 which is attached to the underside of top 22 (FIG. 5). When activated, shaft 62 elongates and pivots support 48 and sleeve 56 from the generally horizontal position of FIG. 5 to the generally vertical, deployed position of FIG. 11.

A rear hatch frame 52 is pivotally attached to the side wall rails 44 by carriage bolts 54 that penetrate legs 52A. The transversely oriented hatch frame 52 suspends a generally rectangular, deployable hatch 66 (FIGS. 8, 10) controlled by a pivoted handle 68. A rubber weatherproofing flap 70 is attached to the hatch bottom edge. A safety glass rear panel 72 is secured by hatch 66. The upper ends of legs 52A of hatch 52 are slidably coupled to guide tracks 74 (FIG. 5) which are attached to the underside of shroud 20.

Figure 6:
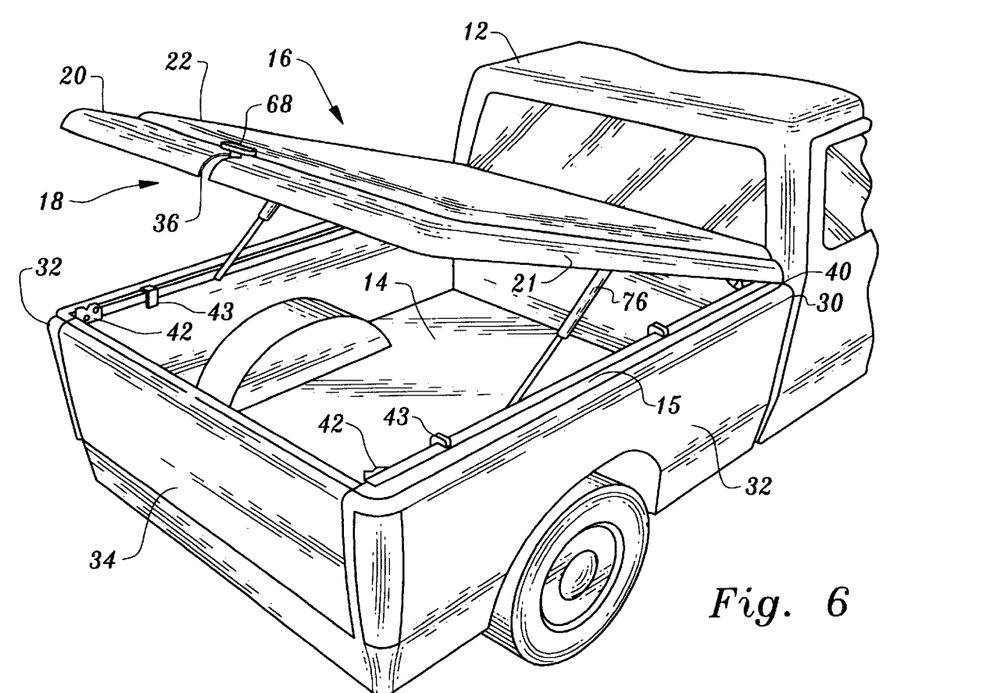
FIG. 6 is a fragmentary perspective view showing the truck bed cover disposed in a fully erected position.

With reference to FIG. 6, cover assembly 16 is shown in the bed cover mode raised to a twenty-degree angle. Shroud 20 is hingedly attached to the forward crosspiece 40 at the bed front, immediately in back of the cab. The cover assembly 16 is raised at the rear, being assisted by hydraulic struts 76. The crosspiece 40 and the base rails 42 (FIG. 7) remain attached to the side panels 32 of truck bed 14 by clamps 43.

Figure 8:
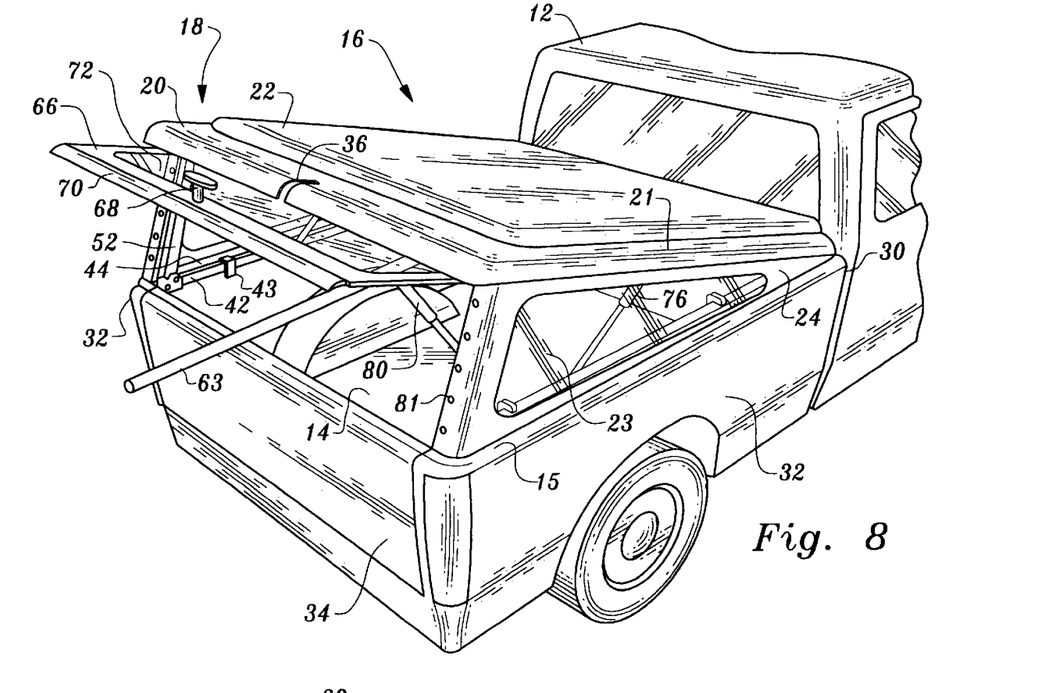
FIG. 8 is a fragmentary perspective view showing the truck bed cover in an intermediate position similar to that illustrated in FIG. 2.

FIG. 8 shows the cover assembly 16 disposed in an intermediate position, assumed when transforming from a bed cover mode to a camper mode. Preferably cover assembly 16 is lowered from the twenty degree angle position shown in FIG. 6 to an angle of fifteen degrees. Hatch frame 52 is shown in a lowered position with the hatch 66 in an open position supported by back hydraulic struts 80. Rails 44 are in a lowered position, with the partial lower walls 24 extended to an open position from a closed, folded position. Snap buttons 81 attached to the rear edges of walls 24 are connectable to snap buttons 82 on hatch frame legs 52A. The extendible shaft 62 projects outwardly from the rear of the truck, passing through the space voided by the displaced raised hatch 66.

Figure 9:
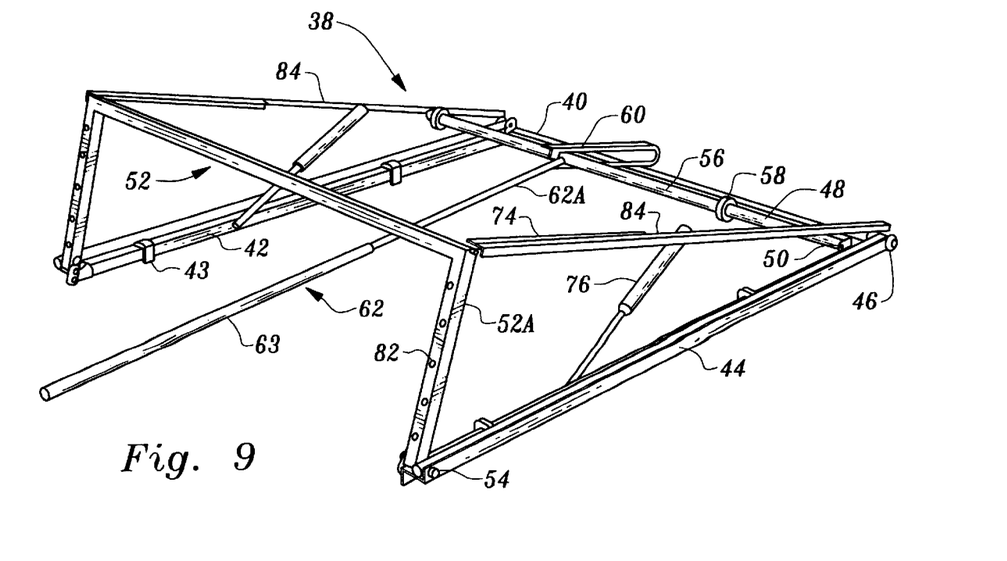
FIG. 9 is a fragmentary perspective view of the actuator frame work, showing how the framework appears when the cover assembly is disposed as in FIG. 6, with portions thereof omitted for clarity.

The upper edge of the side walls 24 (FIG. 8) are attached to the lower hangers 84 (FIG. 9). The lower side hangers 84 are attached to the underside of shroud 20. Guide tracks 74 are attached to the underside of shroud 20. The upper ends of struts 76 are pivotally attached to the inner perimeter of shroud 20. The lowermost ends of struts 76 are pivotally attached to rails 42.

Figure 10:
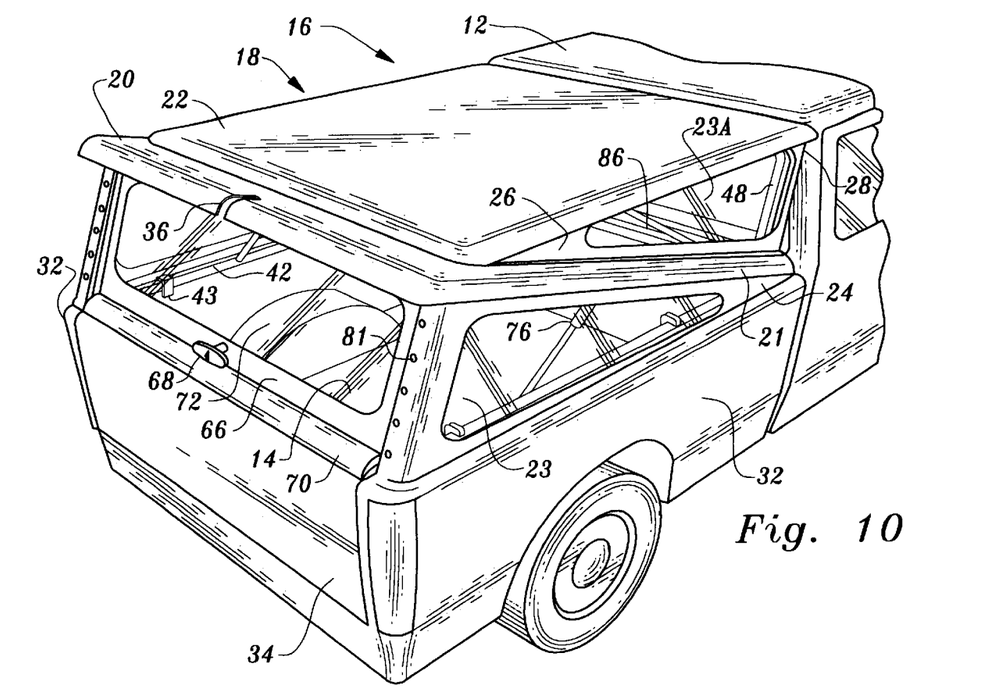
FIG. 10 is a perspective view of the truck bed cover assembly fully deployed, disposed a transformed position similar to that shown in FIG. 3.

As best illustrated in FIG. 10, top 22 is hingedly attached at the rear to shroud 20, allowing top 22 to pivot upward at the front to a fifteen-degree angle to reach the second transformed position establishing the camper mode (FIGS. 3, 10). Top 22 is assisted by upper hydraulic struts 86 when fully deployed. Support 48 is raised to a generally vertical position with the front wall 28 and partial upper walls 26 extended to an open position from a closed, folded position. The vertical outside edges of the front wall 28 are attached (sewn) to the vertical forward edges of the upper partial wall 26.

Figure 11:
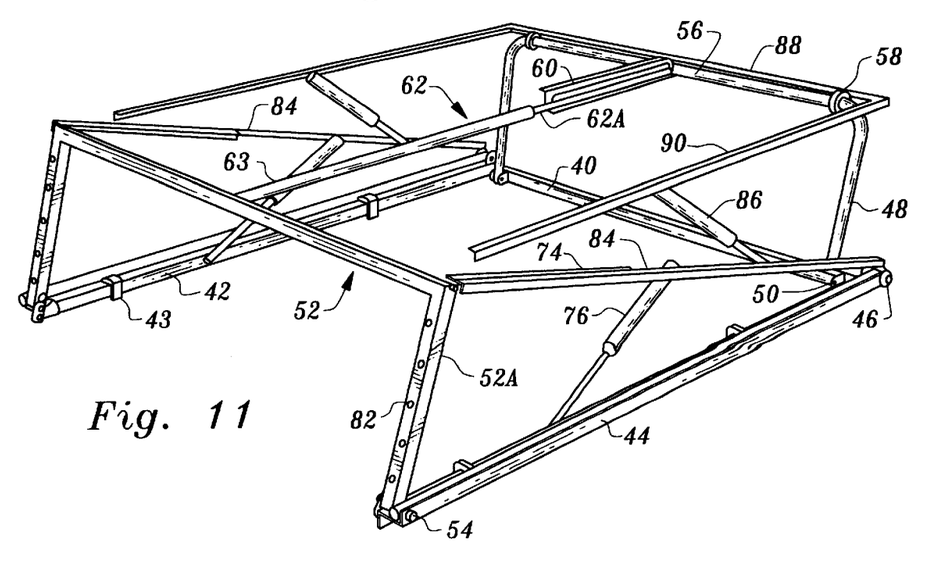
FIG. 11 is a fragmentary perspective view of the actuator framework, showing how the framework appears when the cover assembly is disposed as in FIG. 7.

Front hanger 88 provides support for the front wall 28. The upper edges of side walls 26 (i.e., FIG. 3) are attached to the upper hangers 90 (FIG. 11). The lower edges of walls 26, 28 are attached to the inner perimeter of shroud 20. The front hanger 88 and the upper hangers 90 are attached to the underside of top 22. The upper ends of hydraulic struts 86 are pivotally attached to the upper side hangers 90. The lower ends of the upper hydraulic struts 86 are pivotally attached to the inner perimeter of shroud 20.

Figure 12:
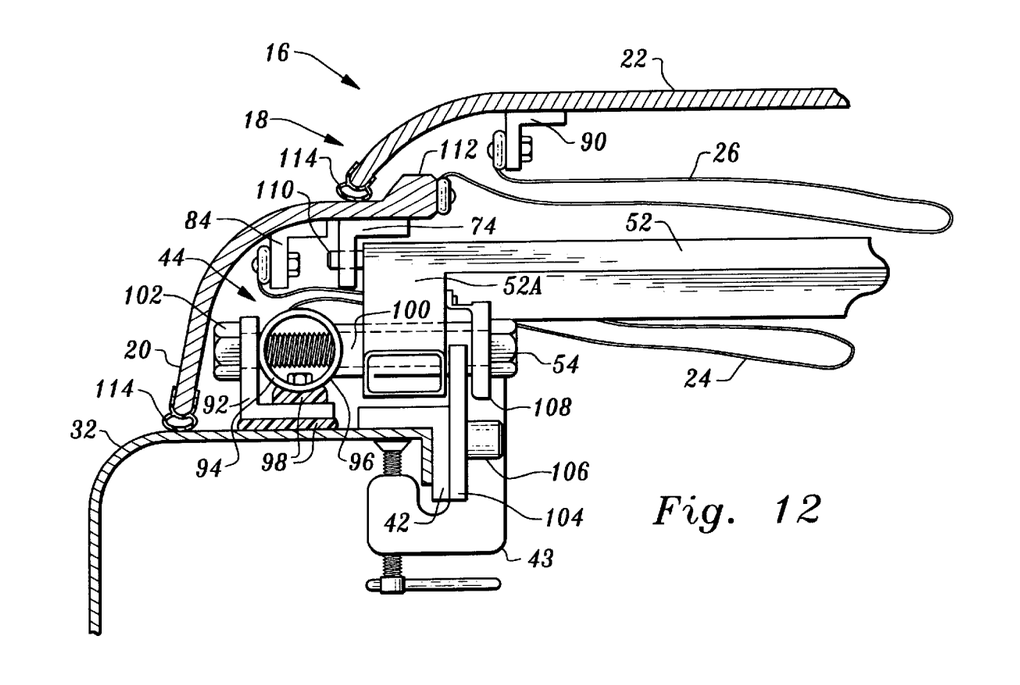
FIG. 12 is a left side partial cross sectional along line 8—8 showing interrelationships of the deck, shroud and related mechanism in the closed position.

With reference now to FIG. 12, rails 44 are of generally L-shaped cross section. The base 92 of each rail rests upon a portion of gasket seal 98 attached to a sleeve 94. The sleeve 94 is captivated within a fabric loop 96 sewn into the lower edge of wall 24 before attachment to the gasket seal 98. Base 98 has weather-stripping 114 attached at both its bottom and top to provide an air- and watertight seal when the, gasket seal 98 is lowered into contact with side panels 32.

Figure 13:
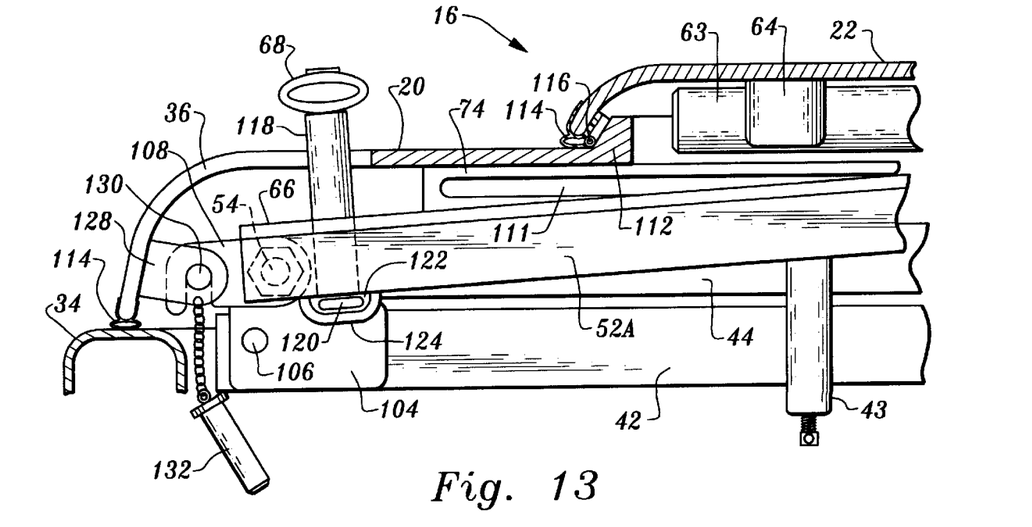
FIG. 13 is an enlarged, fragmentary sectional view taken generally along section line 9—9 of FIG. 4.

The rails 44 are pivotally attached to leg 52A by carriage bolt 54. Leg 52A pivots about bolt 54 and tubular spacer 100 that is coaxial with bolt 54. The portion of the carriage bolt 54, not contained within the nylon tube 100, passes through holes in the end of the side wall rails 44. The carriage bolt 54 attaches to a fastener 102 attached to the outside edge of the gasket seal 98. A cradle bracket 104 attached to rail 42 has a groove in its top seating nylon tube 100. A catch pin 106 is attached to the cradle bracket 104. A turn latch 108 is pivotally attached to the end of carriage bolt 54 inboard of the cradle bracket 104. Latch 108 projecting from the inside edge of leg 52A is connected to the inside edge of leg 52A and pivots in line. Guide pin 110 (FIG. 12) attached to the top of frame legs 52A extends into a slot 111 in the guide 74 (FIG. 13). A raised lip 112 formed along the inner perimeter of shroud 20 dams water. Edge trim weather-stripping 114 is attached at the outer perimeter of shroud 20 and top 22 to form a watertight seal when deck 18 is in the closed position.

Figures 14, 15:
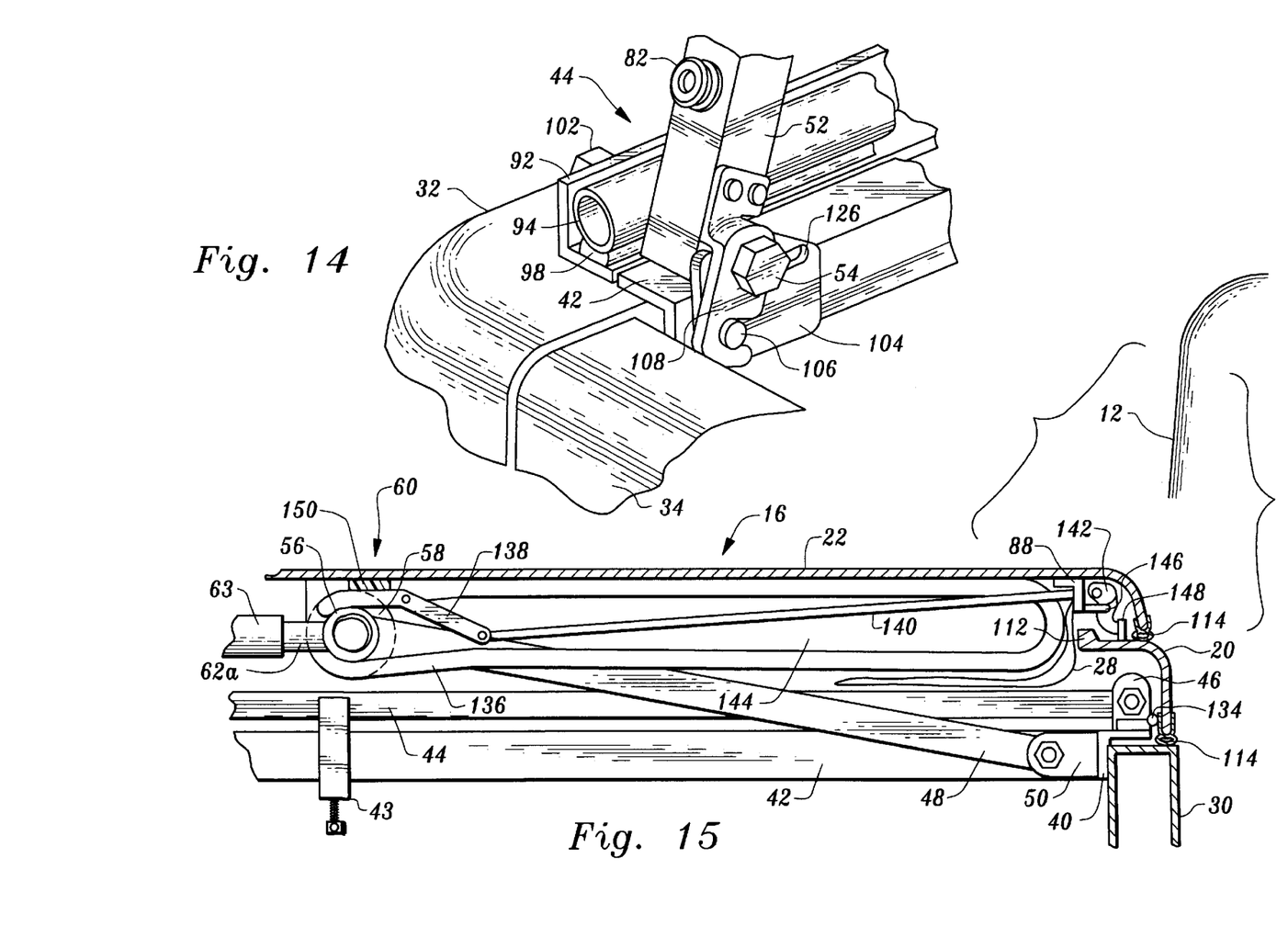
FIG. 14 is an enlarged, partial perspective view of a latch utilized in conjunction with the cradle bracket of FIG. 9.
FIG. 15 is a fragmentary sectional view taken generally along section line 10—10 of FIG. 4.

As shown in FIG. 13, rear hinge 116 pivotally attaches the shroud 20 to top 22. Handle 68 extends through travel slot 36. The handle 68 is splined to shaft 118 which is attached to the bottom of the hatch 66. Shaft 118 reaches retainer rods 120 that are extendible and retractable by turning handle 68. The retainer rods 120 are retained in slots 122 cut through slot brackets 124, which are attached to the lower inside of the frame legs 52A. Retainer rods 120 lock the apparatus when disposed in slots 122; when withdrawn in response to handle rotation, the hatch 66 may be pivotally raised from hatch frame 52. The ends of the retainer rods 120 will extend an inch further outboard from the first extended position to pass through slots 126 within the cradle bracket 104, as shown in FIG. 14. This allows the retaining rods 120 to have a secondary function of securing the rear of the cover assembly 16 to the truck bed 14 while the cover assembly 16 is disposed in the closed position of FIG. 4.

Figure 7:
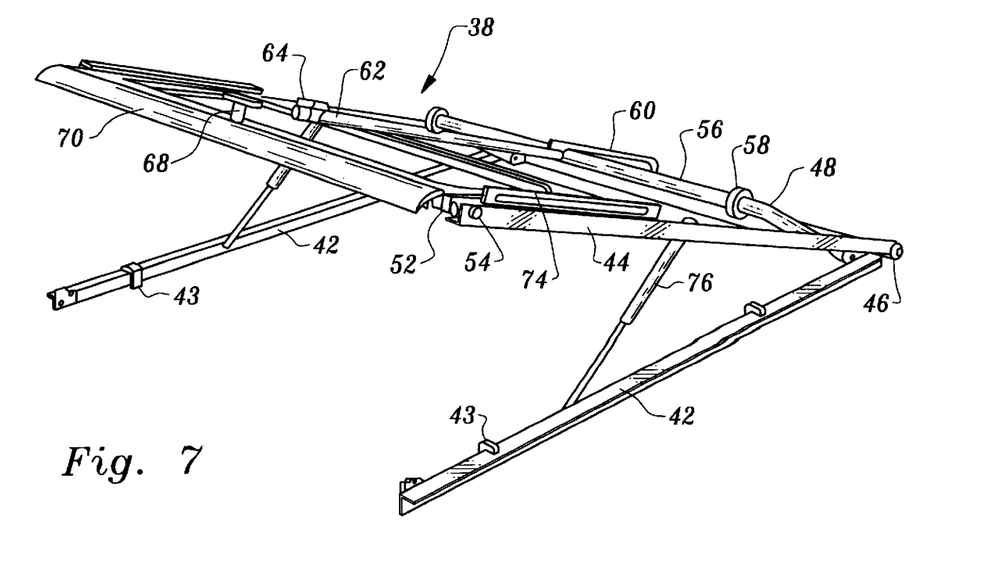
FIG. 7 is a perspective view of the preferred actuator framework, showing how the framework appears when the cover assembly is disposed as in FIG. 6.

While the cover assembly 16 is closed, turn latch 108 (FIGS. 9, 9A) is centered within retainer bracket 128 which is attached to the inside surface of the base frame shroud 20 adjacent to the tailgate 34. Holes 130 bored in the retainer bracket 128 line up with a notch in the turn latch 108 to allow insertion of retaining pin 132 attaching the bottom of legs 52A to shroud 20. This allows the framework 38 and the pliable fabric walls 24, 26, and 28, with the exception of the side base rails 42 attached to the side panels 32 of the truck bed 14, to be raised with the deck 18 as shown in FIG. 6 and 7.

In FIG. 15 shroud 20 is shown pivotally attached to the forward crosspiece 40 by hinge 134. The latch actuator assembly 60 comprises a guide 136, an actuator arm 138, a connecting rod 140, and a latch 142. Guide 136 is attached to the underside of top 22. The top of support 48 is received within sleeve tube 56, passing through a guide slot 144 in guide 136. The actuator arm 138 is pivotally attached to guide 136. The connecting rod 140 is pivotally attached to the actuator arm 138, at one end, and passes through an opening in the front hanger 88 to pivotally attach to the latch 142 at the opposite end. The latch 142 is pivotally attached to a latch bracket 146 which is connected to the front hanger member 88. A catch 148 connected to the front of shroud 20 is selectively engaged by latch 142. A stop pad 150 is attached to top 22 above the actuator arm 138.

Operation

1. Transformation from Bed Cover Mode to Intermediate Mode

Figure 4:
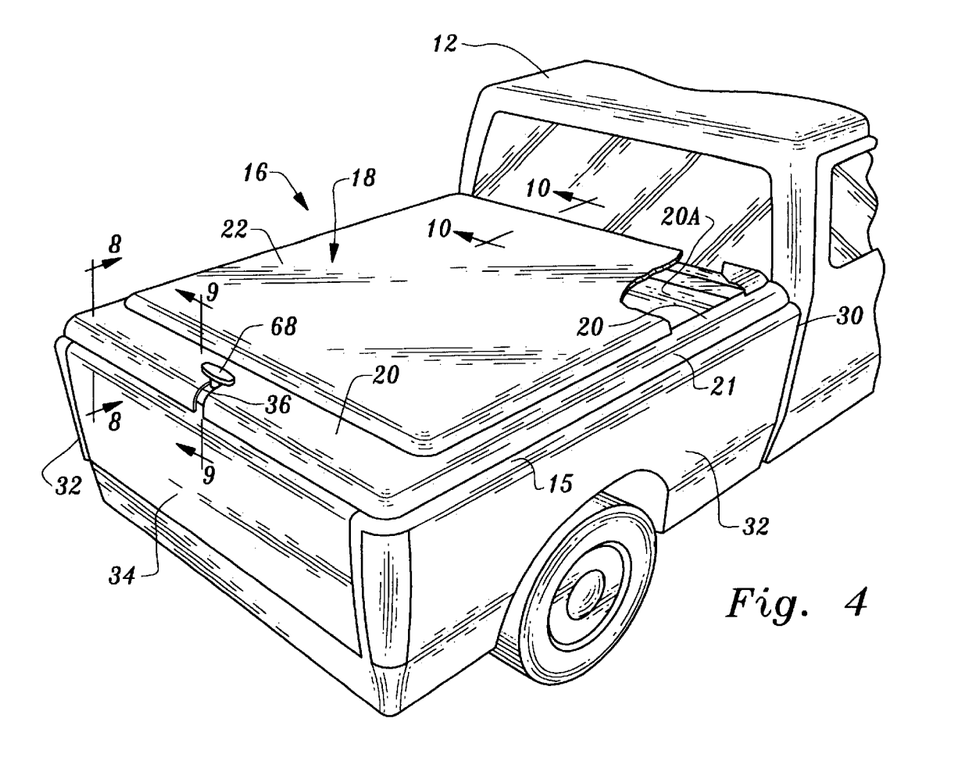
FIG. 4 is a fragmentary, perspective view showing the truck bed cover disposed in a closed, bed cover position.

With the cover assembly 16 in a closed position, as shown in FIG. 4, the handle 68 is rotated retracting retainer rods 128 from slots 126 within cradle bracket 104 (FIG. 14). The cover assembly is pivotally raised at the rear, automatically, by hydraulic struts 76. The cover assembly 16 is now disposed in a fully erect position of twenty degrees, as shown in FIG. 6. At this point, the retainer pins 132 are retracted from holes 130 in retainer brackets 128 attached to the inside of the shroud 20 at the rear (FIG. 13). The latches 108, attached to the bottom of the frame legs 52A of the hatch frame 52, are freed of attachment within the retainer brackets 128 with the extraction of pins 132. The hatch frame 52 can now be lowered via handle 68 with handle shaft 118 passing through handle slot 36 in the rear of shroud 20. The top of the hatch frame 52 is captivated within and guided rearwardly along guide member 74 by pins 110, attached to top of frame legs 52A, sliding through guide slot 111 in the guide 74 (FIGS. 12, 13). The carriage bolt 54 contained within tube 100 pivotally attaches the bottom of frame legs 52A and the side rails 44 (FIG. 12) allowing for simultaneous lowering of both frame members with the forward ends of the side rails 44 lowering pivotally at offset bracket 46 (FIG. 15).

The hatch frame 52 is lowered until the nylon tube 100 sets in a groove on top of the cradle bracket 104. The hatch 66 is detached from the hatch frame 52 by rotating handle 68 which retracts retainer rods 120 from slots 122 within slot brackets 124 attached to the bottom of the frame legs 52A on the inside, (FIG. 13). Hatch 66 is raised pivotally, assisted by struts 80 (FIG. 8). The top of hatch frame 52 is pulled rearwardly, via handle 68 attached to hatch 66, (FIG. 8), until movement is obstructed by pins 110, connected to the top of the frame legs 52A, contacting the aft end of slot 111 within guide member 74, as shown in FIG. 13. The latch 108, connected to the bottom of frame leg 52A, has rotated about the nylon tube 100 seated in the groove atop the cradle bracket 104 to a position where catch pin 106, attached to cradle bracket 104, is captured within latch 108 (FIG. 14). The partial lower walls 24 have been extended to an open position from a closed, folded position by the simultaneous lowering of the side rails 44. Snap caps 81, attached to the rear edges of the partial side walls 24, are connected to the snap buttons 82 attached to the frame legs 52A to seal the rear corners from elements of weather (FIG. 6, 9A).

Extendible shaft 62 is detached from shaft holder 64 and lowered at the rear. Outer shaft 63 is loosened from a locked position containing inner shaft 62A by twisting shaft 63 clockwise about inner shaft 62A. The outer shaft 63 is pulled rearward exposing inner shaft 62A until reaching an internal stop at the aft end of inner shaft 62A and the forward end of outer shaft 63. Outer shaft 63 is relocked to inner shaft 62A by twisting outer shaft 63 counterclockwise about inner shaft 62A until tight. The outer shaft 63 has now been extended rearward almost the entire length of the contained inner shaft 62A and extends through the space voided by the raised hatch 66 (FIGS. 6, 9A).

2. Transformation from Intermediate Mode to Camper Mode

The extendible shaft 62 is now pushed forward manually to begin raising support 48. The tube 56 housing the top of support 48 starts to travel forward along slot 144 in guide 136. Tube 56 is directed slightly upward along slot 144 to engage actuator arm 138 (FIG. 15). Actuator arm 138 is forced upward by continued forward travel of tube 56 along slot 144. The connecting rod 140, pivotally attached to the actuator arm 138, is simultaneously raised and pushed forward by upward rotation of actuator arm 138. When tube 56 reaches the end of the short upward travel span of the slot 144, the actuator arm 138 is fully raised and the connecting rod 140, pivotally attached to latch 142, has forced latch 142 to pivot about latch bracket 146 disconnecting latch 142 from catch 148. The top 22 has been detached from shroud 20 at the precise moment that the roller wheels 58, attached to the top of support 48 at the ends of tube 56, have risen to contact the underside of the top 22. Top 22 is now acted upon by hydraulic struts 86, (FIG. 10,11), and the support 48 is pivotally raised at brackets 50 (FIG. 15), with roller wheels 58 maintaining a centered position of tube 56 moving through slot 144. The aft end of shaft 62 is supported and guided forward manually exerting no force as the support 48 pivots to an upright position. The top 22 is fully raised by hydraulic struts 86 when the tube 56 contacts the forward end of slot 144 (FIG. 15). The rearward end of the outer shaft 63 of shaft 62 is now attached to the inside top of hatch frame 52,(FIG. 11). Shaft 62 is now utilized as frame member between the hatch frame 52 and the support 48 and also prevents the shaft 62 from vibrating loose from the locked position between the outer shaft 63 and the inner shaft 62A.

The front wall 28 along with the partial upper side walls 26 have been automatically extended to an open position from a closed, folded position by the process of transformation. The hatch 66 is lowered and secured to the hatch frame 52 by rotating handle 68 which extends retainer rods 120 to a primary extended position with retainer rods passing through slots 122 in slot bracket 124 (FIG. 13). The transparent vinyl windows 23, contained within the partial lower walls 24, can be unzipped to allow for ventilation.

3. Transformation Back from Camper Mode to Bed Cover Mode

The hatch 66 is detached from the hatch frame 52 by twisting handle 68 which retracts retainer rods 120 from slots 122 in slot bracket 124 (FIG. 13). The hatch 66 is pivotally raised to an open position assisted by struts 80 (FIG. 8). The Shaft 62 is detached from hatch frame 52. Shaft 62 is pulled rearwardly causing the support 48 to lower as the tube 56, housing it at the top, travels back through slot 144 in guide 136, FIG. 15. The struts 86 start to compress and the front wall 28 with the partial upper walls 26 start to collapse as the top 22 is lowered by attachment to the guide 136. The shaft 62 is pulled back until the tube 56 contacts the rear of slot 144 in guide 136 (FIG. 15). The tube 56 has pivoted the back of the actuator arm 138, with over-slam dampened by rubber stop pad 150 attached to underside of top 22, causing the front of the actuator arm 138 to lower. The connecting rod 140 is retracted by the pivotal movement of the actuator arm 138 reconnecting the latch 142 to the catch 148. The support 48 has lowered to a closed position and the top 22 is reattached to the shroud 20 in a closed position, as shown in FIG. 8. The front wall 28 and the partial walls 26 have been automatically returned to a closed folded position and the hydraulic struts 76 are fully compressed. The outer shaft 63 of the extendible shaft 62 is now turned clockwise to loosen locked position to inner shaft 62A. Outer shaft 63 is retracted over inner shaft 62A until reaching an internal stop and outer shaft 63 is twisted counterclockwise about inner shaft 62A until locked. Outer shaft 62 is reattached to shaft holder 64 (FIG. 13).

Snap caps 81, attached to the rear edges of the partial lower walls 24, are detached from the snap buttons 82 which are attached to the frame legs 52A of the hatch frame 52.

The hatch 66 is closed and secured to hatch frame 52 by twisting handle 68. The deck 18 is manually lowered at the rear which causes hatch frame 52 to pivot forward at the top. With shaft 62 in a retracted position, the pins 110 attached to the top of frame legs 52A of hatch frame 52 are free to travel forward through slots 111 in guide 74 (FIG. 12,13). As the deck 18 is lowered, the bottom of hatch frame 52 pivots on the nylon tube 100, housing carriage bolt 54, setting in the groove on top of cradle bracket 104. The hydraulic struts 76 start to compress and the partial lower walls 24 start to collapse with the handle shaft 118 fitting into the handle slot 32, at the rear of shroud 20, as the deck 18 is lowered until contacting the top of the truck bed 14 (FIG. 4). At this time the cover assembly is released to be raised pivotally at the rear, acted upon by the hydraulic struts 76 expanding, to a twenty-degree angle as shown in FIG. 6. The hatch frame 52 is in a folded position (FIG. 7) and the partial lower walls 24 are returned to a closed, folded position. The latches 108, attached to the bottom of the frame legs 52A, have rotated in line with the hatch frame 52 to position in line with the holes 130 in the retainer bracket 128 attached to the inside at the rear of shroud 20 (FIG. 13). Pins 132 can now be reinserted in holes 138 to capture latches 108 within the retainer bracket 128 thereby securing the hatch frame 52 and the rails 44, due to pivotal attachment between the two, to the shroud 20. The deck 18 is manually lowered again to the point at which it contacts the top of the truck bed 14. Handle 68 is rotated extending the retainer rods 120 to a secondary extended position passing through slots 126 in the cradle bracket 104, as shown in FIG. 14, securing the cover assembly 16 to the truck bed 14.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

What is claimed is:

1. A cover assembly for mounting on a pickup truck having an open bed defined by upstanding sides and a tailgate disposed rearwardly of a cab, said cover assembly being transformable between a closed configuration in which said cover assembly completely enshrouds said truck bed for securing contents therein, an intermediate configuration, and a fully deployed camper configuration in which said cover assembly defines, in concert with the truck bed, a habitable enclosure, said assembly comprising:
   a first segment, said first segment being stored in a substantially flat orientation on said truck bed when said cover assembly is in the closed configuration, said first segment being hingeably secured behind the cab of the truck, and foldably deployed to form a first wedge thereabout to said intermediate configuration to move said cover assembly to said intermediate configuration;
   a second segment hingeably coupled to said first segment, at a point remote from the cab of the pickup truck, said second segment being stored substantially flat upon the first segment when the assembly is disposed in the closed configuration and then deployed to form a second wedge disposed upon said first wedge and complimentary thereto to transform said cover assembly to said camper configuration;
   a skeletal framework attached to the upstanding sides of the truck bed of the pickup truck;
   said skeletal framework including a transverse cross piece, said transverse cross piece being rotatable to elevate said second segment upwardly from the first segment to transform said cover assembly from said intermediate configuration to said camper configuration; and
   an extendible shaft, said extendible shaft being operatively connected to said cross piece for selectively deploying said second segment, said extendible shaft being accessible from a rear of said pickup truck;
   wherein said first and second segments form said habitable enclosure generally shaped like a parallelepiped when said cover assembly is deployed in said camper configuration.

2. The cover assembly as defined in claim 1 further comprising a deployable, compound deck enclosing the truck bed when the assembly is disposed in said closed configuration.

3. The cover assembly as defined in claim 2 wherein said compound deck comprises a shroud and a top that are folded upon one another in generally planar relation when the cover assembly is disposed in said closed configuration, the shroud forming a border between said segments, and said deck top forming a top of the second segment and wherein said second segment top is coplanar with the roof of the cab when extended to said camper configuration.

4. The cover assembly as defined in claim 3 wherein said shroud comprises a curved periphery shaped to fit over said truck bed when in a closed configuration.

5. The cover assembly as defined in claim 1 wherein said skeletal framework is disposed within the truck bed for deploying and retracting the assembly;
   said skeletal framework further comprising hatch means pivoted to said first segment for initially releasing the first and second segments for deployment to initially transform the assembly from the closed configuration for providing user ingress and egress once the assembly is fully deployed; and
   a hatch frame means deployed by said hatch means for supporting the segments in said intermediate configuration.

6. A cover assembly for mounting on a pickup truck having an open bed defined by upstanding sides and a tailgate disposed to a rear of a cab, said cover assembly being transformable between a closed configuration in which said cover assembly completely enshrouds said truck bed for securing contents therein, an intermediate configuration, and a fully deployed camper configuration in which said cover assembly defines, in concert with the bed, a habitable enclosure, said assembly comprising:
   a first segment, said first segment being stored in a substantially flat orientation on said truck bed when the assembly is in the closed configuration, said first segment being hingeably secured behind the cab of the pickup truck, and foldably deployed to form a first wedge thereabout to said intermediate configuration to move said cover assembly to said intermediate configuration;

a second segment hingeably coupled to said first segment, at a point remote from the cab of the pickup truck, said second segment being stored substantially flat upon the first segment when the assembly is disposed in the closed configuration and then deployed to form a second wedge disposed upon said first wedge and complimentary thereto to transform said cover assembly to said camper configuration;

a skeletal framework attached to the upstanding sides of the truck bed;

said skeletal framework including a transverse cross piece, said transverse cross piece being rotatable to elevate said second segment upwardly from the first segment to transform the assembly from said intermediate configuration to said camper configuration;

hatch means pivoted to said first segment for initially releasing the first and second segments for deployment to initially transform the assembly from the closed configuration, and for providing user ingress and egress once the assembly is in said camper configuration;

an extendible shaft accessible through said hatch means for deploying said transverse cross piece and being operatively connected to said transverse cross piece for selectively deploying said second segment;

an actuator arm pivotally attached to said transverse cross piece;

a connecting rod pivotally attached to said actuator arm; and a latch pivotally attached to said connecting rod and detachably connectable between the first and second segments;

wherein said first and second segments form said habitable enclosure generally shaped like a parallelepiped when said assembly is deployed in said camper configuration.

7. The cover assembly as defined in claim 6 further comprising compound deck comprising a shroud and a top that are folded upon one another in generally planar relation when the cover assembly is disposed in said closed configuration, the shroud forming a border between said segments, and said deck top forming a top of the second segment when said cover assembly is deployed in said camper configuration.

8. The cover assembly as defined in claim 7 wherein:
said shroud comprises a curved periphery shaped to fit over said truck bed when in a closed position and wherein said compound deck is coplanar with a roof of the cab when extended to said camper configuration; and said top comprises a curved periphery shaped to fit over an inner periphery of said shroud when the assembly is disposed in said closed configuration.

9. The cover assembly as defined in claim 6 wherein said skeletal framework is attached to the upstanding sides of the truck bed for deploying and retracting the assembly;
said hatch frame means is deployed for supporting the segments in said intermediate configuration; and said transverse cross piece is pivoted to said skeletal framework for deploying the second segment by elevating the second segment upwardly from the first segment.

* * * * *